No. 649,437. Patented May 15, 1900.
W. S. & C. I. CORBY.
APPARATUS FOR WORKING AND SHAPING PLASTIC SUBSTANCES.
(Application filed Oct. 10, 1898.)
(No Model.) 2 Sheets—Sheet 1.
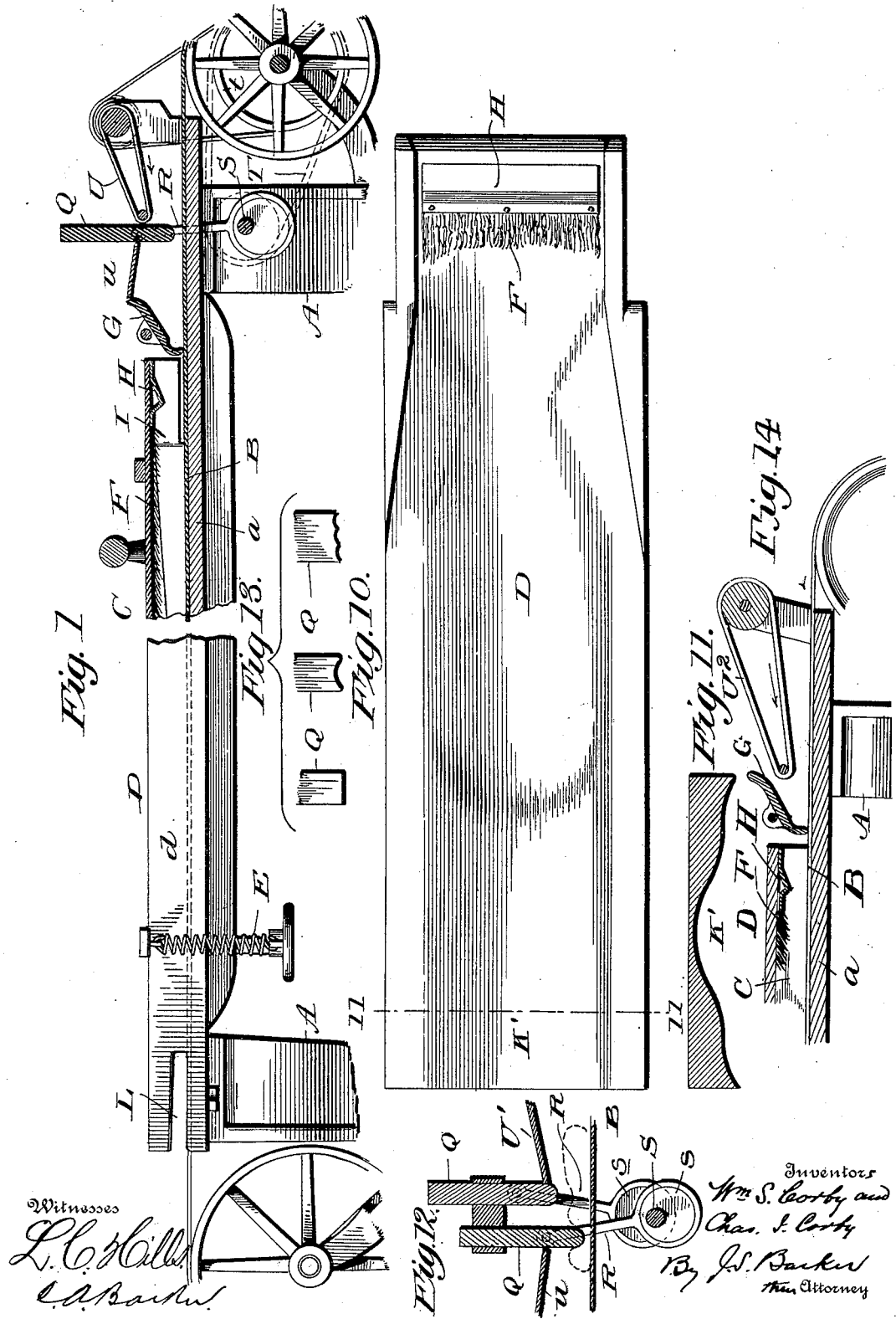

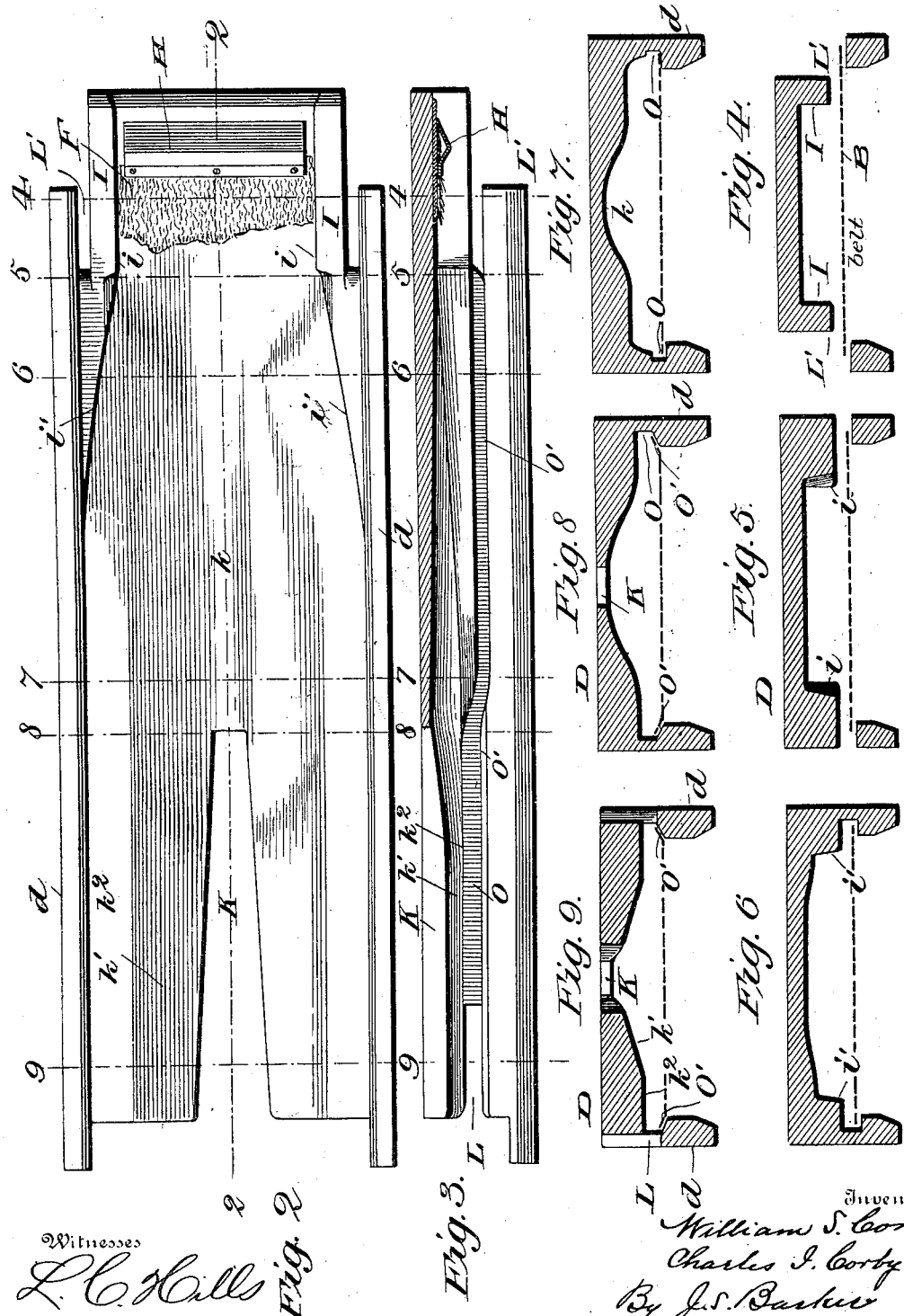

UNITED STATES PATENT OFFICE.

WILLIAM S. CORBY AND CHARLES I. CORBY, OF WASHINGTON, DISTRICT OF COLUMBIA.

APPARATUS FOR WORKING AND SHAPING PLASTIC SUBSTANCES.

SPECIFICATION forming part of Letters Patent No. 649,437, dated May 15, 1900.

Application filed October 10, 1898. Serial No. 693,146. (No model.)

*To all whom it may concern:*

Be it known that we, WILLIAM S. CORBY and CHARLES I. CORBY, citizens of the United States, residing at Washington, in the District of Columbia, have invented certain new and useful Improvements in Apparatus for Working and Shaping Plastic Substances, of which the following is a specification.

Our invention has for its object to improve machines for the working, shaping, and molding of plastic substances, and is particularly adapted and constructed for the working or molding of dough into loaves.

The particular objects sought to be attained by our improvements are to improve the skin or surface of the masses of dough during the working operation, to provide the apparatus with an improved form of curler, to produce new forms of pressure-board for the apparatus, and to produce an apparatus which will make Vienna loaves of bread—that is, loaves which are the largest at the middle and have tapering ends.

The invention consists in an improvement in the apparatus and certain parts thereof for operating on dough or similar plastic substances by means of which the above and other objects are attained, and which improvements will be hereinafter particularly pointed out.

In the drawings, wherein our improvements are illustrated, Figure 1 is a side elevation, partly in central longitudinal section, of one form of a machine to which our improvements are shown applied. Fig. 2 is an inverted plan view of a pressure-board embodying certain of our improvements which may be used in connection with a machine like that shown in Fig. 1. Fig. 3 is a central longitudinal section of the pressure-board, taken on the line 3 3 of Fig. 2. Figs. 4 to 9 are transverse sectional views taken on lines 4 4 to 9 9, respectively, of Figs. 2 and 3. Fig. 10 is an inverted plan view of a pressure-board somewhat different from that shown in Fig. 2. Fig. 11 is a transverse section of this pressure-board, taken on the line 11 11 of Fig. 10. Fig. 12 is a detail sectional view showing a different form of device for "sheeting" the dough from that shown in Fig. 1. Fig. 13 is a detail view showing several forms of reciprocating sheeting-bars. Fig. 14 is a longitudinal sectional view showing another embodiment of certain features of our invention.

The machine illustrated in Fig. 1 is of the general type shown in our Patent No. 590,133, dated September 14, 1897, to which reference is made for a detailed description of parts which it is not necessary here to describe.

In the drawings, A represents the framework, and B an endless belt which operates to advance the dough masses through the dough working or molding passage-way C. Opposite to the working face of the belt there is arranged a pressure-board D, which by preference is held in position yieldingly by means of the springs E.

We shall in this case uniformly denominate that element of the apparatus which is opposed to the means for advancing the dough and which operates in connection therewith to shape the dough masses, resisting the free forward movement of the dough, as the "pressure-board." It will be understood that this element of our apparatus may be constructed of wood or metal or other suitable material and may be of various shapes; but for uniformity of expression we denominate it the "pressure-board," whatever be its particular construction and of whatever material it may be composed.

We have found that a very superior finish to the skin or outer surface of the loaf is given if one of the parts which engages with the dough mass while passing through the passage-way C is of a soft yielding nature, such as the wool side of a piece of lamp or sheep skin. When such a material is used, we find that the loaf will spring or rise to a greater extent during the baking operation and that the crust of the baked loaf will be of a more attractive color or hue than when the dough loaf engages with a hard unyielding surface during the molding operation. We believe that the reason for this is that when a soft and yielding surface is opposed to the dough while being molded a less proportion of the gas is worked or squeezed out of the skin of the dough than when a hard unyielding surface is employed. The best results we have obtained by applying a fleece to the under or working surface of the pressure-board, as represented at F.

Instead of applying the fleece to the pressure-board it might be applied to the endless belt or to any other element of the apparatus which serves to advance the dough through the molding passage-way, or both of these parts might be provided with a soft yielding working face, although we have found it best to apply it only to the pressure-board.

We have found that the best results are secured by the use of lamb or sheep skin, as the wool does not mat down and become hard to any considerable extent, and a fleece does not rapidly wear out; but any other substance, natural or artificial, which presents a soft yielding surface to the dough while being molded and which does not become hard and unyielding under the conditions of use would come within the scope of our invention.

As is well known, the material which we have just referred to has a surface of loose-ended filaments which are adapted to arrange themselves and to lie in a direction substantially parallel with the direction of the longitudinal or forward movement of the dough masses under the conditions of use.

H represents the "curler," by which term we designate that part of the apparatus which engages with the forward part of an advancing mass or sheet of dough and curls, turns over, or thickens such forward part, so that when the dough mass enters the working or molding chamber or passage it is in condition to be jointly operated upon by the parts B and D of the apparatus and rolled or coiled into a compact and homogeneous mass or loaf. This curler is secured to or carried by the pressure-board, being, as we prefer to make it, in the form of a rib secured to the under or working face of the pressure-board near its rear or feed end. By applying the curler to the pressure-board we insure its having a fixed relation to the working or molding passage-way C, which is advantageous, particularly when the pressure-boards are made as separate and independent articles of manufacture adapted to be applied to machines already constructed. The rib which forms the curler H is arranged transverse to the longitudinal axis of the pressure-board and to the path of the dough masses, and, besides operating to curl the dough, also tends to cause the front edges of the masses to be straight and transverse to the direction of their movement as they enter the working passage and are begun to be rolled up.

When a pressure-board provided with a curler like that just described, and shown at H, is applied to a machine having a spring-actuated curling device G like that represented in Fig. 1, it is not necessary that either of the curlers G or H should be removed, but both are allowed to remain, and they operate conjointly to effect the curling operation. When such conjoint action takes place, this second (in order of operation) curler H operates with the advantages above claimed for it—that is to say, it effects the complete curling at a fixed place relative to the working passage C and effects a straightening of the forward edge of the dough masses should this become necessary. With some doughs, particularly those of a stiff consistency, the use of two sets of curling devices has been found decidedly advantageous.

Another part of our invention is the production of an apparatus for making Vienna bread—that is to say, loaves the ends of which taper. Heretofore it has been impossible, we believe, to properly mold bread into loaves of this shape by machinery, it not only being difficult to impart to the loaves the proper shape, but impossible to properly work them throughout their entire length—that is to say, to avoid too much working at one part and too little at another. This, however, we have accomplished most successfully, and have done so by giving to the pressure-board a peculiar construction whereby the pressure upon the dough mass as it moves through the dough working or molding passage-way C is gradually relieved from the middle part or belly of the loaf as compared with the pressure upon the ends and whereby the ends are given the proper amount of working, with the result that the loaf is enlarged at the middle and tapered toward the ends, and the whole loaf from end to end is so properly worked that it retains its shape after emerging from the molding passage-way.

We will first describe in detail the preferred form of the pressure-board, as illustrated in Figs. 2 to 9, inclusive. In these views the pressure-board is shown without the fleece lining F in order that the shape of its working surface may be better illustrated. It is immaterial, so far as this part of our invention is concerned, whether or not the fleece lining be used. In practice we prefer to shape the board as shown in the drawings and then to apply the fleece.

$d$ $d$ represent the sides of the pressure-board. They extend by preference past the side edges of the top or table $a$ of the framework over which the belt runs, and they constitute the side walls of the molding passage-way C.

At the rear or feed end of the pressure-board it is provided with or has secured to its working face the side guides I, which operate to confine the ends of the dough mass until it has been rolled together by the conjoint action of the belt and pressure-board. These guides are preferably parallel with the main axis of the board at their rear ends, as indicated at $i$, and flare or separate, as indicated at $i'$, toward their forward ends. We prefer that they should extend about half-way toward the forward or delivery end of the pressure-board.

Commencing a short distance from the rear or feeding end of the pressure-board its working face is inversely bellied at the longitudinal center—that is, it is so shaped that its center is farther away from the working face of the belt than are the edge portions of the working face of the pressure-board. The relative distance of the central longitudinal part of the working face of the pressure-board from the belt as compared with the side parts thereof increases toward the forward or delivery end of the board, so that the pressure upon the mass of material in the molding passage-way C is gradually relieved at the middle thereof as the mass moves forward, with the result that the mass accumulates toward the center of the loaf, forming what is known in the trade as a loaf with a "belly." We have found it advantageous to relieve the pressure upon the middle part of the loaf entirely at about a third of the distance from the forward end of the board, and to secure this we cut away the center of the board, as represented at K. The opening thus formed preferably tapers toward the rear end, as indicated in Fig. 2. Instead of entirely cutting away the board, as indicated at K, forming an opening through it, substantially the same result would be obtained by so shaping the rear middle part of the working face of the board as to materially lessen the pressure therefrom upon the dough mass, and such construction is indicated at K' in Figs. 10 and 11. The central inversely-bellied part of the working face of the pressure-board in rear of the opening K is represented by $k$. Extending outward from this part $k$ and from either side of the aperture K are the outward flaring or inclined working surfaces $k'$, and between the inclined working faces $k'$ and the edges of the board are the flat working surfaces $k^2$. These latter surfaces are preferably parallel or substantially parallel with the working face of the opposing member—that is, the belt B. A pressure-board thus shaped when used in combination with means for advancing a dough mass operates to give the loaf a proper shape for a Vienna loaf of bread. By gradually reducing the pressure from the board upon the central part of the loaf the belly of the loaf is produced, and the working faces $k'$ and $k^2$, particularly the latter, operate to properly work and shape the ends of the dough loaf, so that not only is the proper taper imparted thereto, but also the ends are so worked as to retain their tapering shape after emerging from the machine.

While we have described the preferred and what we believe to be the best form of pressure-board for producing a Vienna loaf of bread, yet we do not wish to be confined to a pressure-board constructed exactly according to the lines or form described, as many of the advantages incident to our invention would be retained in a pressure-board differing in particulars from that shown and described or one having only certain of the features which have been set forth.

The sides $d$ of the pressure-board are cut away or removed for a short distance from the front end of the board, as indicated at L, so as to entirely remove the pressure from the ends of the dough-mass just before the molding operation is completed. This permits the loaf to spread out laterally at the ends or tapered portions somewhat beyond the normal width of the dough working or molding passage-way C. By increasing the spring-pressure upon the board at the delivery end thereof the extent to which the tapered portions of the loaf shall be extended may be increased and the size to which they are worked may be somewhat reduced, the removal of the sides $d$, as just described, permitting this.

The belt B, while within the working or molding passage-way C, is preferably flat, as we do not consider it necessary or even advantageous to turn up the edges at right angles to the main central portion of the belt, as is found best in making the ordinary styles of bread. To hold the edges of the belt down flat as it enters the working or molding passage-way C, the guides I have their lower faces so disposed as that they lie close to the face of the table $a$ when the board is in its inactive or normal position, so that there is left between the lower edges of the guides I and the table $a$ only sufficient space for the belt to pass easily between them. This is desirable for the reason that where the belt is frequently used with its edges turned up there is always a tendency on the part of the edges of the belt to turn up slightly, and unless provision is made for holding them flat they do not always pass smoothly through the molding passage-way.

The sides $d$ of the pressure-board are preferably cut away at their rearward ends, as at L', in order to permit the belt to properly and easily enter the molding passage-way C.

The edges of the belt run in channels O, formed in the sides $d$ and situated outside the outer edges of the table $a$. When the pressure-board is lifted under the influence of a mass of dough which is being passed between it and the belt, the bottom edges O' of the channels O are brought substantially opposite to the top of the table $a$, and they serve, in connection with such table, to support the belt from edge to edge. As will be seen from an examination of Figs. 3, 8, and 9, the bottoms of the channels O toward the forward or delivery end of the board are upwardly inclined, as indicated at O'. This is for the purpose of slightly turning up the edges of the belt toward the delivery end of the molding passage-way C in order to assist in tapering and properly shaping the ends of the loaf. This inclining of the bottom surfaces of the belt-channels O is not necessary to the successful working of our invention, although we prefer to so construct the board.

Some of the advantages of that part of our invention which relates to a pressure-board so constructed as to properly mold and form Vienna bread would be retained if the sides $d$ were entirely omitted, and such a construction is indicated in Figs. 10 and 11.

The improvements which have thus far been described are applicable not only to an apparatus in which the means for advancing the masses of dough is an endless belt and the pressure-board is flat, so that the molding passage-way C, formed between them, is straight, but also to a machine of that type in which the means for advancing the dough masses is a revolving wheel or drum and the pressure-board is in the form of a curved plate or shoe arranged opposite to and substantially parallel with the periphery of such wheel or drum.

Our improvements thus far described, when applied to a straight machine like that shown in Fig. 1, are adapted to be used in combination with a pair of rollers adapted to sheet the dough masses, as represented in our aforesaid patent. Some bakers, however, object to the use of sheeting-rollers, particularly where it is desired to make a loaf with a very thin crust, holding that the rollers work the life out of the dough and tend to make the crust or skin compact and tough. We have therefore devised a novel mechanism for flattening out or sheeting the dough masses preparatory to the curling operation, and we will now describe this feature of our invention, referring particularly to Fig. 1.

In rear of the feed end of the pressure-board and directly above the belt B and the support or table $a$, over which it travels, we arrange a vertically-reciprocating bar Q, which is disposed transversely to the direction of movement of the belt. This bar has imparted to it a rapid up-and-down reciprocatory movement through the links R, arranged at the sides of the machine and operated from eccentrics $s$ upon a shaft S. The shaft S is driven in any suitable manner, as by means of a belt or chain T connecting the shaft with a driving-wheel $t$ upon the shaft on one of the supporting-rollers for the belt B. A single reciprocating sheeting-bar is represented in Fig. 1; but where rapid work is being done it is sometimes desirable to duplicate these bars and connect them with their operating devices, so that they work alternately, as represented in Fig. 12, as then the bars do not have to be run so rapidly in order to properly flatten out the dough masses. The ends of the bars which engage with the dough we prefer to round, as represented in Figs. 1 and 12; but they may be shaped otherwise, if desired, as represented in Fig. 13.

It will be observed that a dough sheeting or flattening device such as we have just described acts interruptedly upon the dough—that is to say, between the portions of the mass which are directly engaged by the edge of the bar Q there are other portions of the dough which have not been touched by the sheeting devices and which are consequently left soft and uncompressed and full of the gas of fermentation. We find that a satisfactory sheeting of the dough sufficient to prepare it for the curling operation may be effected by a device such as we have described which will engage with not more than one-half of the surface of the dough mass which is exposed to the action of the sheeting or flattening devices and that the skin of the loaf made from a dough mass thus flattened is not so compact and tough as when rolls or equivalent devices which act on the entire surface of the mass are employed. It will also be observed that the dough-sheeting device consists of a relatively-small body, such as a rod or bar, (small as compared with the size of the mass of dough being sheeted,) which body is alternately moved toward and from the mass of dough which it acts upon, such movements taking place with considerable or great rapidity.

A shield or guard U is arranged adjacent to and in rear of the reciprocating sheeting-bar, so as to properly direct the dough masses to the latter and to prevent them from being lifted thereby should the operating edge of the bar tend to stick to the dough. If found desirable, a second shield or guard $u$, arranged in front of the reciprocating bar or bars, may be employed.

The first or rearmost shield may be in the form of a stationary plate or board, as represented in Fig. 12 at U'. We prefer, however, that it should be in the form of an endless belt, so driven that its lower face moves in the same direction and with the same speed as the belt B. When thus constructed, the shield performs not only the functions heretofore attributed to it, but the additional one of serving to assist in advancing the dough masses to the sheeting devices. By inclining the lower working face of the belt U downward toward its forward end, as represented in Fig. 1, it will operate to preliminarily reduce the thickness of a dough mass should one of unusual thickness or size be fed to the machine, so that it will pass under the bar Q and not be caught or stopped against its rear face.

In Fig. 14 is shown a construction in which the reciprocating sheeting or flattening bar or bars are entirely dispensed with and the flattening or sheeting of the dough mass preparatory to the curling operation is effected by a belt $U^2$. This belt is similar to the belt U shown in Fig. 1, except that it is somewhat longer and approaches at its forward end nearer to the belt B, and is also arranged quite close to the curler, though this latter arrangement is not essential.

For simplicity of construction we make the belt B to serve both for advancing the dough masses past the means for flattening or sheeting them and also through the working passage-way C; but it is apparent that our invention would be equally embodied in a machine in which the advancing means for the dough while being sheeted or flattened were different from the means which operate to advance it through the working passage-way C.

In the molding of dough into loaves preparatory to the baking operation great care has to be exercised in order that the dough loaf as an entire mass be properly compacted or rolled together without its being unduly compressed, as upon the proper compacting and forming into a loaf of the dough mass largely depends the texture of the baked loaf, and heretofore the skill of the human hand has been almost entirely depended upon to accomplish the desired results. We, however, by making the pressure-board yielding are enabled to get an approximately-perfect result in the particular just referred to by machinery. Great care should also be exercised in molding the dough loaf that the skin of the loaf be not ruptured, as by dragging or pulling operations in the molding, or that it be unduly worked, hardened, or compacted. Here, too, the human hand has prior to our present improvements been depended upon to secure the best results; but by the use of a working dough-engaging surface of the soft and yielding character hereinbefore described we are enabled in a machine to make dough loaves having the desired quality of outer skin or surface. These two features of manipulation which have just been referred to are each to a certain extent independent one of the other, and yet they coöperate to produce a perfect loaf of bread and are both secured by our present improved machine.

The forms of pressure-board made according to our present invention and as hereinbefore described will be made and sold as complete articles of manufacture and may be applied to or removed from the complete machine as occasion may require.

What we claim is—

1. In a machine for working dough and shaping it into loaves, the combination of means for advancing the dough masses, a pressure-board yieldingly supported adjacent to such advancing means so as to be movable to a limited extent toward and from the same, and a dough-engaging face of soft, yielding material carried by one of the said parts, whereby the dough masses are carried through the machine with a rolling motion so as not to break or rupture the skin thereof, and whereby the skin is left in a soft and uncompacted condition, substantially as set forth.

2. A pressure-board for a machine for working plastic substances, having a lining of fleece, substantially as set forth.

3. In a machine adapted for working plastic substances, the combination of an endless belt, a pressure-board opposed thereto, and a fleece secured to the working face of the pressure-board, substantially as set forth.

4. In a machine for working plastic substances, the combination of means for advancing the material being operated upon and a pressure-board, one of these parts having a working face of a material the surface of which is formed of loose-ended filaments adapted to lie substantially parallel with the direction of movement of the material, substantially as set forth.

5. A pressure-board for a machine for working or shaping plastic substances and a curling device carried by the pressure-board near its feed end, substantially as set forth.

6. A pressure-board for a machine for working and shaping plastic substances provided with a curling device consisting of a rib H arranged near its rear or feed end and transverse to the longitudinal axis of the board, substantially as set forth.

7. The combination of means for advancing a mass of plastic material, a pressure-board, a curler G situated near the entrance to the molding passage-way between such parts, and another curling device situated between the curler G and the said passage-way, substantially as set forth.

8. In a machine for working plastic substances, the combination of the pressure-board, a means for advancing the material, these two being so arranged as to form a working space between them, a curler, G, and another curling device carried by the pressure-board, substantially as set forth.

9. In a machine for working dough, the combination of an endless belt, means for sheeting the masses of dough, a pressure-board arranged opposite to the working face of the belt, a curler situated between the feed end of the pressure-board and the "sheeting" means, and another curling device carried by the pressure-board, substantially as set forth.

10. In a machine for working or shaping plastic material, the combination of means for advancing the masses of material to be shaped, and a pressure-board opposed thereto constructed to gradually diminish the pressure upon the center of the mass as it is moved forward, substantially as set forth.

11. In a machine for working or shaping plastic material, the combination of means for advancing the masses of material to be treated, and a pressure-board opposed thereto, its working surface being progressively farther from the working face of the advancing means in the direction of the movement of the latter, whereby the pressure on the center of the masses is gradually relieved, substantially as set forth.

12. A pressure-board for a machine for working or shaping plastic substances being cut away at its longitudinal central part to entirely relieve the pressure upon the material being worked, at the center, substantially as set forth.

13. A pressure-board for a machine for working or shaping plastic substances having a portion of its central longitudinal part toward its rear end cut away, substantially as set forth.

14. A pressure-board for a machine for working or shaping plastic substances having a tapering aperture K at its rear longitudinal central portion, substantially as set forth.

15. In a machine for working and shaping plastic material, the combination of means for advancing the masses of material to be treated, and a pressure-board opposed thereto, the latter being cut away toward its delivery end, substantially as set forth.

16. A pressure-board for a machine for working or shaping plastic material having its working face inversely bellied at its longitudinal center, and having guides or shaping-pieces near its edges toward the rear or feed end thereof, substantially as set forth.

17. A pressure-board for a machine for working or shaping plastic materials, having its working face inversely bellied at its rear longitudinal part, and cut away at its forward central longitudinal part, substantially as set forth.

18. A pressure-board for a machine for working or shaping plastic substances having a central longitudinal portion shaped to relieve the pressure on the material at the center, and having on either side of such central part working faces in another plane from such central working part, substantially as set forth.

19. In a machine for working or shaping plastic materials, the combination of means for advancing the materials to be operated upon, and a pressure-board opposed thereto, its working face at its longitudinal center being farther distant from the working face of the advancing means than is its working face at its edges, substantially as set forth.

20. In a machine for working or shaping plastic materials, the combination of means for advancing the material to be operated upon, and a pressure-board opposed thereto, its working face at its longitudinal center being farther distant from the working face of the advancing means than is its working face at its edges, the latter parts, being substantially parallel with the working face of the advancing means, substantially as set forth.

21. A pressure-board for a machine for working or shaping plastic substances, having a portion of its working face at its longitudinal center removed, and having on either side of such removed portion working surfaces, substantially as set forth.

22. A pressure-board for a machine for working or shaping plastic substances, having a portion of its working surface at its longitudinal center removed, and having on either side of such removed portion substantially-flat working surfaces $k^2$, substantially as set forth.

23. A pressure-board for working or shaping plastic substances having a portion of its working surface at its longitudinal center removed, and having on either side of such removed portion outward-flaring working faces $k'$, and outside of these flaring working surfaces substantially-flat working surfaces $k^2$, substantially as set forth.

24. A pressure-board for a machine for working or shaping plastic substances having side pieces, these being cut away or removed toward the forward or delivery end thereof, substantially as set forth.

25. In a machine for working or shaping plastic substances, the combination of means for advancing the material to be treated, the pressure-board having side pieces, these being removed toward the forward or delivery end of the board, means which hold the pressure-board in working position with a yielding force, substantially as set forth.

26. In a machine for working or shaping plastic substances, the combination of means for advancing the material to be treated, and a pressure-board having side pieces, these being removed toward the forward or delivery end of the board, and the pressure-board having flat working surfaces, $k^2$, adjacent to the edges of the board where the sides are removed, substantially as set forth.

27. In a machine for working or shaping plastic substances, the combination of means for advancing the material to be treated, a pressure-board having side pieces, these being removed toward the forward or delivery end of the board, and having flat working surfaces $k^2$ adjacent to the edges of the board where the sides are removed, and means which hold the pressure-board in working position with a yielding force, substantially as set forth.

28. In a machine for working or shaping plastic substances, the combination of an endless belt, a pressure-board having side flanges the faces of which are channeled for the edges of the belt, substantially as set forth.

29. In a machine for working or shaping plastic substances, the combination of an endless belt, a pressure-board having sides in the inner faces of which are formed channels for the edges of the belt, the sides being cut away at their forward ends to facilitate the entrance of the belt into such channels, substantially as set forth.

30. In a machine for working or shaping plastic substances the combination of a belt for advancing the material, and a pressure-board having sides in the inner faces of which are formed channels in which run the edges of the belt, the bottoms of such channels being inclined, as at $O'$, whereby the edges of the belt are inclined relative to its central portion, substantially as set forth.

31. A pressure-board for a machine for working or shaping dough having near its rear or feed end side guides I, the working surface of the board being inversely bellied, the bellying of the working surface commencing between the forward portions of the said side guides, substantially as set forth.

32. The combination of a means for advancing a mass of dough, and means, which are small relative to the mass of dough, for operating upon the dough to flatten or sheet the same, such means being arranged to move toward and from the mass of dough rapidly, whereby the dough is acted upon intermittently, substantially as set forth.

33. The combination with a means for advancing a mass of dough, of a bar, adapted to move toward and from the mass of dough to operate thereon to flatten it, such bar having a dough-engaging edge or face which is small relative to the mass of dough, and being arranged to operate rapidly, whereby the dough mass is acted upon intermittently, substantially as set forth.

34. The combination of a continuously-moving means for advancing a plastic mass and means for engaging with the material to compress or flatten it at interruptedly-successive points, whereby a portion only of the surface of the dough mass is acted upon to effect the said flattening, substantially as set forth.

35. The combination with means for advancing a dough mass, a reciprocating means for flattening the same, and a shield or guard arranged adjacent to the dough-flattening means, substantially as set forth.

36. The combination, with means for advancing a dough mass, of a reciprocating bar for flattening the same and shields or guards on either side of said reciprocating bar, substantially as set forth.

37. The combination of means for advancing a plastic mass, reciprocating means for flattening the same, and a shield or guard arranged in rear of the said reciprocating means and consisting of a belt U, and means for driving said belt, substantially as set forth.

38. The combination of means for advancing a dough mass, means for interruptedly operating upon the dough mass for flattening the same, a curler, and means for rolling the curled mass into a loaf, substantially as set forth.

39. The combination of means for advancing a mass of dough, a pair of reciprocating bars Q arranged side by side, and means for alternately reciprocating the said bars, substantially as set forth.

40. The combination of a belt for advancing masses of dough, another belt arranged opposite thereto, and having its operating-face movable in the same direction as the first-named belt, a curler in front of the second-named belt, and means for forming the dough mass into a compact loaf in front of the curler, substantially as set forth.

WILLIAM S. CORBY.
CHARLES I. CORBY.

Witnesses:
   GEO. T. MAY, Jr.,
   GEO. R. LINKINS.